United States Patent
Le et al.

(10) Patent No.: US 11,732,669 B2
(45) Date of Patent: Aug. 22, 2023

(54) INJECTOR DIAGNOSIS DEVICE AND INJECTOR DIAGNOSIS METHOD

(71) Applicant: Hitachi Construction Machinery Co., Ltd., Tokyo (JP)

(72) Inventors: Tien Trien Le, Kanagawa (JP); Hisashi Yokoyama, Ibaraki (JP); Satoshi Inose, Ibaraki (JP); Shogo Kunioka, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 17/436,972

(22) PCT Filed: Apr. 24, 2020

(86) PCT No.: PCT/JP2020/017693
§ 371 (c)(1),
(2) Date: Sep. 7, 2021

(87) PCT Pub. No.: WO2020/218510
PCT Pub. Date: Oct. 29, 2020

(65) Prior Publication Data
US 2022/0170427 A1 Jun. 2, 2022

(30) Foreign Application Priority Data
Apr. 26, 2019 (JP) .................. 2019-086099

(51) Int. Cl.
*F02D 41/22* (2006.01)
*F02D 41/14* (2006.01)
*F02D 41/28* (2006.01)

(52) U.S. Cl.
CPC ....... *F02D 41/221* (2013.01); *F02D 41/1401* (2013.01); *F02D 2041/1433* (2013.01);
(Continued)

(58) Field of Classification Search
CPC ............... F02D 41/1401; F02D 41/221; F02D 2041/1433; F02D 2041/224; F02D 2041/288; F02D 2200/025
See application file for complete search history.

(56) References Cited

U.S. PATENT DOCUMENTS

2005/0094826 A1* 5/2005 Morishita ................ H04R 5/02
381/86
2009/0158833 A1 6/2009 Kusatsugu
(Continued)

FOREIGN PATENT DOCUMENTS

JP 2001-221096 A 8/2001
JP 2002-122037 A 4/2002
(Continued)

OTHER PUBLICATIONS

International Search Report (PCT/ISA/210) issued in PCT Application No. PCT/JP2020/017693 dated Jun. 23, 2020 with English translation (five (5) pages).
(Continued)

*Primary Examiner* — Hung Q Nguyen
*Assistant Examiner* — Mark L. Greene
(74) *Attorney, Agent, or Firm* — Crowell & Moring LLP (57) ABSTRACT

An injector diagnosis device 1 includes: an engine sound model generator 14 configured to generate a normal engine sound model and an abnormal engine sound model based on the number of cylinders of the engine and a combustion pattern of the engine; an operating sound obtainment unit 12 configured to obtain the operating sound of the engine operating with the combustion pattern; a frequency characteristics calculation unit 13 configured to calculate the frequency characteristics of the operating sound obtained by the operating sound obtainment unit 12; and an injector diagnosis unit 15 configured to diagnose whether or not the injectors have a failure based on the frequency characteris-
(Continued)

tics of the operating sound which is calculated by the frequency characteristics calculation unit 13, and the normal engine sound model and the abnormal engine sound model which is generated by the engine sound model generator 14.

15 Claims, 9 Drawing Sheets (52) U.S. Cl.
CPC .. *F02D 2041/224* (2013.01); *F02D 2041/288* (2013.01); *F02D 2200/025* (2013.01)

(56) References Cited

U.S. PATENT DOCUMENTS

| | | | |
|---|---|---|---|
| 2011/0196572 A1 | 8/2011 | Tsuchikiri et al. | |
| 2013/0148817 A1* | 6/2013 | Moriya | H04R 29/00 381/56 |

FOREIGN PATENT DOCUMENTS

| | | |
|---|---|---|
| JP | 2005-120842 A | 5/2005 |
| JP | 2009-146086 A | 7/2009 |
| JP | 2009-150246 A | 7/2009 |
| JP | 2010-89760 A | 4/2010 |
| JP | 2016-14375 A | 1/2016 |
| JP | 2020-2897 A | 1/2020 |

OTHER PUBLICATIONS

Japanese-language Written Opinion (PCT/ISA/237) issued in PCT Application No. PCT/JP2020/017693 dated Jun. 23, 2020 (four (4) pages).

* cited by examiner

INJECTOR DIAGNOSIS DEVICE AND INJECTOR DIAGNOSIS METHOD

TECHNICAL FIELD

The present invention relates to an injector diagnosis device and an injector diagnosis method of diagnosing the status of injectors installed in a multi-cylinder engine and injecting fuel for each of the cylinders.

The present application claims priority from Japanese patent application JP 2019-086099 filed on Apr. 26, 2019, the entire content of which is hereby incorporated by reference into this application.

BACKGROUND ART

Some of the vehicles such as a construction machine including a multi-cylinder engine have an engine controller equipped with a failure diagnosis function. The failure diagnosis function detects disconnections and short circuits by monitoring the energized state of the injectors that inject fuel into the cylinders. Although this failure diagnosis function detects electrical failures of the injectors, it is difficult for the function to detect a mechanical failure of the injectors due to fuel fixation or stiffness. For this reason, mechanical failures are often not noticed until a performance deterioration or an obvious abnormal state such as white smoke or black smoke occurs. This means that a malfunction suddenly happens. Such a sudden malfunction may lead to downtime of the construction machine, and hinder the stable operation of the construction machine.

Then a method has been proposed, in which fuel injection is intentionally stopped for each cylinder, and the operator diagnoses the injectors about a mechanical failure by listening to a change in the operating sound of the engine. This method, however, is based on the humans' sensory perception for listening, so that it not only depends on the rich experiences and advanced knowledge of the operator, but also causes a problem that the results are likely to vary.

Patent Literature 1 and Patent Literature 2 disclose a conventional technique about a method for diagnosing whether or not the injector is a faulty injector by measurement of the undulation of rotational fluctuation and the designated fuel injection amount. These methods, however, are time-consuming, and a simple diagnosis method that can easily diagnose a mechanical failure of the injector has been required.

Patent Literature 3 discloses a conventional technique of diagnosing or predicting a vehicle failure. This technique collects status data for a predetermined period or distance, creates a normal state model using the data, and then compares the status data to be diagnosed and the normal state model to diagnose whether the vehicle has a failure or not.

Patent Literature 4 discloses a conventional technique of creating a reference value for vehicle failure diagnosis. To this end, this literature discloses a device that generates data during normal driving from the driving data during the occurrence of failures that are stored in the vehicle.

CITATION LIST

Patent Literature

Patent Literature 1 JP 2002-122037 A
Patent Literature 2 JP 2016-014375 A
Patent Literature 3 JP 2009-146086 A
Patent Literature 4 JP 2010-089760 A

SUMMARY OF INVENTION

Technical Problem

All of the devices described in these patent literatures, however, require collection or storage of relevant data in the past, and thus it is difficult to say that these devices easily diagnose whether or not the injectors have a mechanical failure.

In view of the above-described circumstances, the present invention aims to provide an injector diagnosis device and an injector diagnosis method capable of easily detecting whether or not the injectors have a mechanical failure.

Solution to Problem

An injector diagnosis device according to the present invention is configured to diagnose a status of each of injectors installed in a multi-cylinder engine, the injector injects fuel to a corresponding cylinder. The injector diagnosis device includes: an engine sound model generator configured to generate a normal engine sound model and an abnormal engine sound model based on the number of the cylinders of the engine and a combustion pattern of the engine; an operating sound obtainment unit configured to obtain the operating sound of the engine operating with the combustion pattern; a frequency characteristics calculation unit configured to calculate the frequency characteristics of the operating sound obtained by the operating sound obtainment unit; and an injector diagnosis unit configured to diagnose whether or not the injectors have a mechanical failure based on the frequency characteristics of the operating sound which is calculated by the frequency characteristics calculation unit, and the normal engine sound model and the abnormal engine sound model which is generated by the engine sound model generator.

The injector diagnosis unit of the injector diagnosis device according to the present invention diagnoses whether or not the injectors have a mechanical failure based on the frequency characteristics of the operating sound which is calculated by the frequency characteristics calculation unit, and the normal engine sound model and the abnormal engine sound model which is generated by the engine sound model generator. This configuration does not have to collect or store relevant data in the past as in the conventional techniques, and the present invention therefore enables easy diagnosis about whether or not the injectors have a mechanical failure.

An injector diagnosis method according to the present invention diagnoses a status of each of injectors installed in a multi-cylinder engine, the injector injects fuel to a corresponding cylinder. The method includes: an engine sound model generating step of generating a normal engine sound model and an abnormal engine sound model based on the number of the cylinders of the engine and a combustion pattern of the engine; a frequency characteristics calculation step of obtaining the operating sound of the engine that operates with the combustion pattern, and calculating the frequency characteristics of the obtained operating sound; and an injector diagnosis step of diagnosing, based on the normal engine sound model and the abnormal engine sound model which is generated at the engine sound model generating step and the frequency characteristics of the operating sound which is calculated at the frequency characteristics calculation step, whether or not the injectors have a mechanical failure.

The injector diagnosis method of the present invention includes the engine sound model generating step of generating a normal engine sound model and an abnormal engine sound model, the frequency characteristics calculation step of calculating the frequency characteristics of the operating sound, and the injector diagnosis step of diagnosing a mechanical failure of the injectors based on the normal engine sound model, the abnormal engine sound model, and the frequency characteristics of the operating sound. This configuration does not have to collect or store relevant data in the past as in the conventional techniques, and the present invention therefore enables easy diagnosis about whether or not the injectors have a mechanical failure.

Advantageous Effects of Invention

The present invention enables easy diagnosis of mechanical failures of injectors.

DESCRIPTION OF EMBODIMENTS

The following describes some embodiments of an injector diagnosis device and an injector diagnosis method according to the present invention, with reference to the drawings. Like reference numerals designate like parts throughout the figures of the present description to omit their redundant explanations.

First Embodiment of Injector Diagnosis Device

Figure 1:
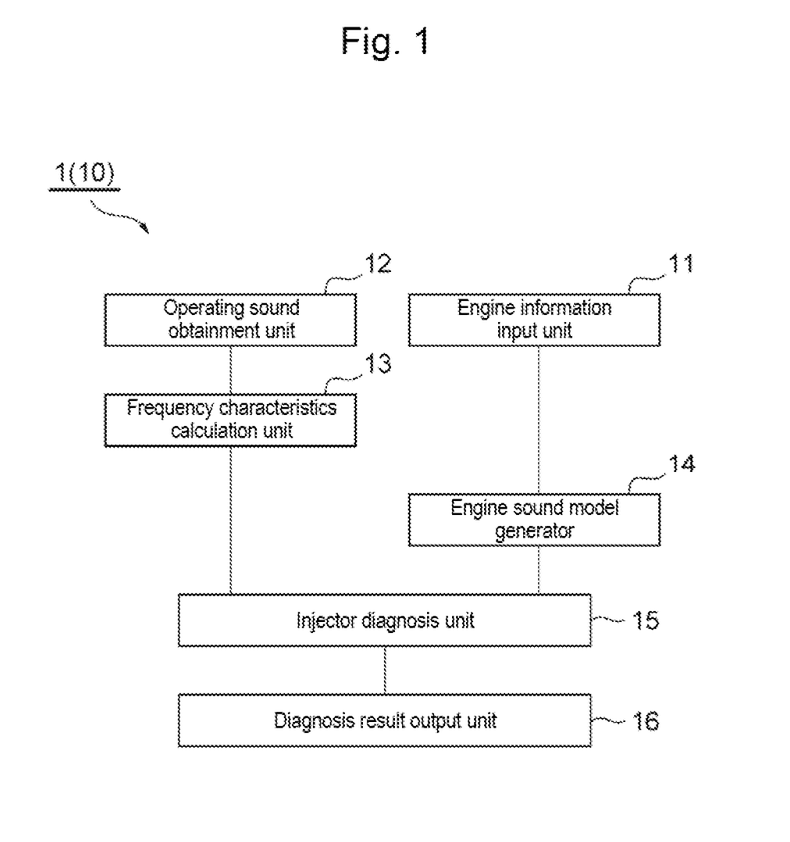
FIG. 1 schematically shows the configuration of an injector diagnosis device according to a first embodiment.
Figure 2:
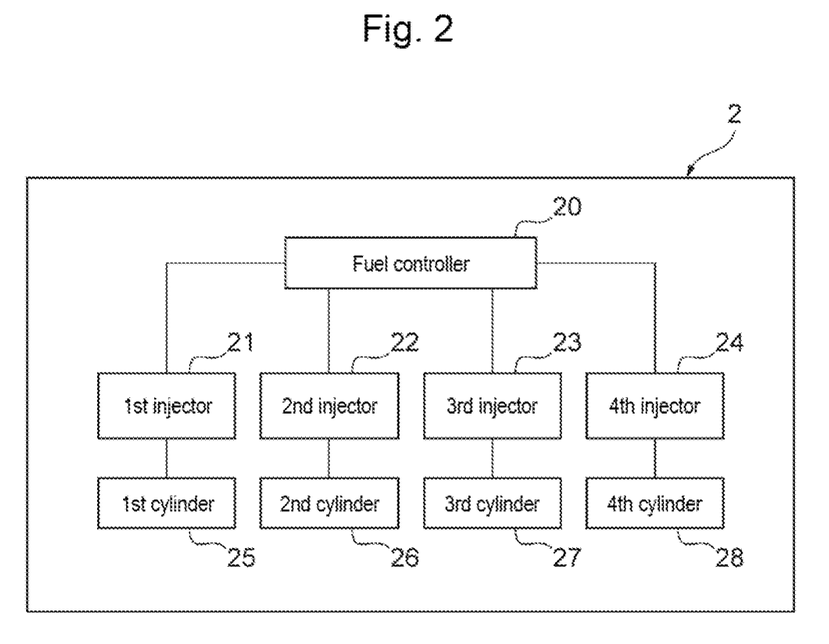
FIG. 2 schematically shows the configuration of a multi-cylinder engine.

FIG. 1 schematically shows the configuration of an injector diagnosis device according to a first embodiment, and FIG. 2 schematically shows the configuration of a multi-cylinder engine. An injector diagnosis device 1 of the present embodiment is to diagnose the status of a plurality of injectors installed in a multi-cylinder engine 2. Specifically, the injector diagnosis device 1 diagnoses whether or not each injector has a mechanical failure, and whether or not each injector has a sign of the mechanical failure.

The multi-cylinder engine 2 is mounted on a construction machine, for example, and includes four cylinders (first cylinder 25, second cylinder 26, third cylinder 27 and fourth cylinder 28) arranged in series, injectors (first injector 21, second injector 22, third injector 23 and fourth injector 24) that each inject fuel into the inside of the corresponding cylinder, and a fuel controller 20 that controls the fuel injection of each injector.

In one example, the fuel controller 20 includes a microcomputer made up of the combination of a central processing unit (CPU) that executes calculations, a read only memory (ROM) as a secondary storage that records programs for the calculations, and a random access memory (RAM) as a temporary storage of the calculation progress or temporary control variables. The fuel controller 20 controls the fuel injection of each injector by executing the stored programs. In one example, the fuel controller 20 calculates a designated fuel injection according to the engine load, and controls the operation of each injector so as to reach the calculated designated fuel injection.

Without failures, the injectors inject fuel with their designated fuel injection designated by the fuel controller 20. With any mechanical failure, the injectors will inject fuel with an amount different from the designated fuel injection described above. This causes a change in the operating sound of the engine. Focusing on this change in the operating sound, the injector diagnosis device 1 of this embodiment is configured to diagnose whether or not the injectors have a mechanical failure based on the change in the operating sound. When the injectors have no mechanical failures, the injector diagnosis device 1 further diagnoses whether or not the injectors have a sign of a mechanical failure.

The injector diagnosis device 1 is installed in a mobile terminal such as a smartphone, a tablet terminal, a mobile phone, or a personal digital assistant (PDA). The following describes an example of the injector diagnosis device 1 that is installed in a smartphone 10, which may be other mobile terminals such as a tablet terminal, a mobile phone, and a PDA.

As shown in FIG. 1, the injector diagnosis device 1 includes an engine information input unit 11, an operating sound obtainment unit 12, a frequency characteristics calculation unit 13, an engine sound model generator 14, an injector diagnosis unit 15, and a diagnosis result output unit 16.

The engine information input unit 11 is configured to input the number of cylinders of the engine and the combustion pattern of the engine. For example, in the case of a multi-cylinder engine that combusts at regular intervals, the engine rotation speed is determined by the type (this may be referred to as the model) of the multi-cylinder engine 2. The operating condition of the low idle mode may be determined as a diagnostic condition. Then the operator may select the model of the multi-cylinder engine 2 on the screen of the smartphone 10 to obtain the number of cylinders of the engine and the combustion pattern of the engine. Note here that the combustion pattern of the engine means the combustion interval of the engine, which is determined by the rotation speed of the engine. For another method of obtaining the number of cylinders of the engine and the combustion pattern of the engine, the smartphone 10 may obtain the information through a communication with the construction machine, on which the multi-cylinder engine 2 is mounted, via Bluetooth (registered trademark) or Wi-Fi.

In one example, the operating sound obtainment unit 12 is a microphone built in the smartphone 10, and records the operating sound of the multi-cylinder engine 2 operating in the input engine combustion pattern for a certain period of time (for example, 15 seconds). This operating sound obtainment unit 12 is electrically connected to the frequency characteristics calculation unit 13, and outputs the obtained operating sound to the frequency characteristics calculation unit 13. Although the recording position is not particularly limited, a location as close as possible to the multi-cylinder engine 2 is preferable for the recording position.

In one example, the frequency characteristics calculation unit 13 calculates the frequency characteristics of the operating sound output from the operating sound obtainment unit 12 by a fast Fourier transformation (FFT). The calculated frequency characteristics of the operating noise include not only the operating sound of the engine but also the noise. This frequency characteristics calculation unit 13 is electrically connected to the injector diagnosis unit 15, and outputs the calculated frequency characteristics of the operating sound to the injector diagnosis unit 15.

The engine sound model generator 14 generates a normal engine sound model and an abnormal engine sound model based on the number of cylinders of the engine and the combustion pattern of the engine that are obtained from the engine information input unit 11. In one example, the engine sound model generator 14 generates a combustion frequency component related to the number of cylinders of the engine and the combustion pattern of the engine, and an abnormal frequency component that appears only in the abnormal engine sound model related to the ratio of the primary combustion frequency to the number of cylinders.

Figure 3A:
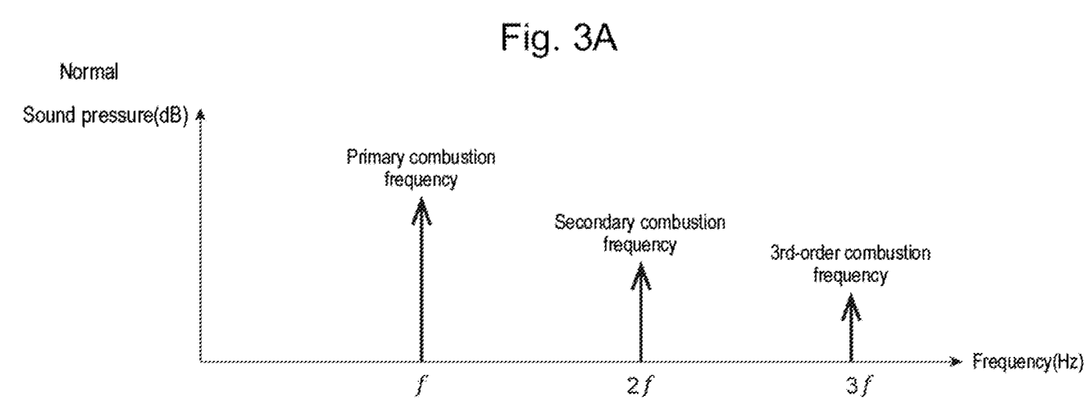
FIG. 3A schematically shows an example of a normal engine sound model which is generated by an engine sound model generator.
Figure 3B:
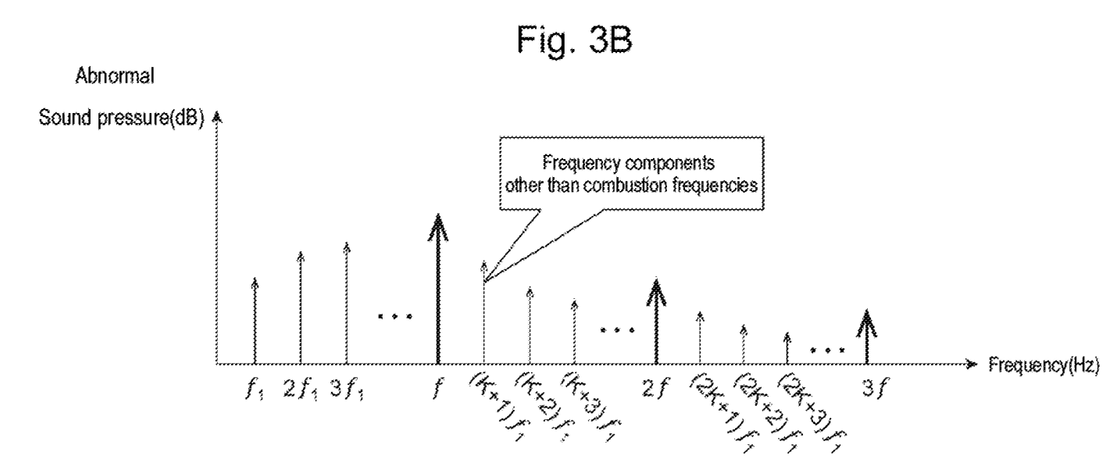
FIG. 3B schematically shows an example of an abnormal engine sound model which is generated by an engine sound model generator.

FIG. 3A schematically shows an example of a normal engine sound model which is generated by the engine sound model generator, and FIG. 3B shows an example of an abnormal engine sound model which is generated by the engine sound model generator. FIGS. 3A and 3B show an example of a 4-stroke/1-cycle engine, and the frequency f is the primary combustion frequency, which is obtained based on the following equation (1). The frequency $f_1$ is the abnormal frequency that appears only in the abnormal engine sound model, and is calculated based on the following equation (2).

$$f = \frac{1}{\text{combustion interval}} = \frac{1}{\text{cylinder number} \times \frac{\text{engine rotation speed [rpm]}}{60} \times \frac{1}{2}} \text{ [Hz]} \quad (1)$$

$$f_1 = \frac{f}{\text{cylinder number}} \text{ [Hz]} \quad (2)$$

As can be seen from a comparison between FIG. 3A and FIG. 3B, the abnormal engine sound model has frequency components (that is, abnormal frequencies) located at predetermined locations, in addition to the combustion frequencies existing in the normal engine sound model. In other words, the abnormal frequencies only appear in the abnormal engine sound model. These abnormal frequencies are specific frequencies described later. Letter K in FIG. 3B denotes the number of cylinders.

The engine sound model generator 14 is electrically connected to the injector diagnosis unit 15, and outputs the generated normal engine sound model and abnormal engine sound model to the injector diagnosis unit 15.

The injector diagnosis unit 15 diagnoses whether or not the injector has a mechanical failure based on the frequency characteristics of the operating sound which is calculated by the frequency characteristics calculation unit 13, and the normal engine sound model and the abnormal engine sound model which is generated by the engine sound model generator 14. Specifically, the injector diagnosis unit 15 detects the combustion frequency components and the specific frequency (i.e., abnormal frequencies as stated above) components based on the frequency characteristics of the operating sound which is calculated by the frequency characteristics calculation unit 13, and the normal engine sound model and the abnormal engine sound model which is generated by the engine sound model generator 14. The injector diagnosis unit 15 then compares the sound-pressure level of the specific frequency components with the sound-pressure level of the combustion frequency components to diagnose whether or not the injectors have a mechanical failure. The following describes the diagnosis in details by way of examples.

Firstly, based on the frequency characteristics of the operating sound which is calculated by the frequency characteristics calculation unit 13, and the normal engine sound model and the abnormal engine sound model which is generated by the engine sound model generator 14, the injector diagnosis unit 15 detects the sound-pressure level near the primary combustion frequency component, the sound-pressure level near the secondary combustion frequency component, the sound-pressure level near an integer multiple component of the frequency that is the ratio of the primary combustion frequency to the number of cylinders and is located between the primary combustion frequency and the secondary combustion frequency, and the sound-pressure level of noise. Note here that the sound-pressure level near an integer multiple component of the frequency that is the ratio of the primary combustion frequency to the number of cylinders and is located between the primary combustion frequency and the secondary combustion frequency is an example of the sound-pressure level of the specific frequency components described above.

Next, the injector diagnosis unit 15 calculates the average sound-pressure level of the primary and secondary combustion frequency components based on, for example, the detected sound-pressure level near the primary combustion frequency component and sound-pressure level near the secondary combustion frequency component, and compares the calculated results with the sound-pressure level of the noise described above. If it is determined that the average sound-pressure level of the primary and secondary combustion frequency components is not sufficiently high compared to the sound-pressure level of the noise, the injector diagnosis unit 15 determines that the multi-cylinder engine 2 is not the target of diagnosis or that the recording conditions are wrong.

In contrast, if the average sound-pressure level of the primary and secondary combustion frequency components is sufficiently high compared to the average sound-pressure level of the noise, the injector diagnosis unit 15 calculates the ratio between the sound-pressure level near an integer multiple component of the frequency that is the ratio of the primary combustion frequency to the number of cylinders and is located between the primary combustion frequency and the secondary combustion frequency and the average sound-pressure level of the primary and secondary combustion frequency components, and diagnoses the status of the injectors using the calculated ratio.

For example, if the ratio between the average sound-pressure level near an integer multiple component of the frequency that is the ratio of the primary combustion frequency to the number of cylinders and is located between the primary combustion frequency and the secondary combustion frequency and the average sound-pressure level of the primary and secondary combustion frequency components is smaller than a predetermined first threshold, the injector diagnosis unit 15 diagnoses that the injectors do not have a mechanical failure (i.e., no abnormality). In contrast, if this ratio is the first threshold or more and is smaller than a predetermined second threshold, the injector diagnosis unit 15 diagnoses that the fuel injection from the injectors is abnormal, i.e., that the injectors have a sign of mechanical failure. If this ratio is the first threshold or more and is the second threshold or more, the injector diagnosis unit 15 diagnoses that the injectors have a mechanical failure (i.e., including a faulty injector). The second threshold is larger than the first threshold.

The diagnosis result output unit 16 is electrically connected to the injector diagnosis unit 15, and receives a diagnostic result from the injector diagnosis unit 15 and informs the operator of the result. For example, the diagnosis result output unit 16 informs the operator by displaying information on the presence or not of a mechanical failure of the injectors and on the presence or not of a sign of mechanical failure on the display screen of the smartphone 10. The information on the diagnosis result may be displayed on the display screen of the smartphone 10 and also may be transmitted to a server described later.

The injector diagnosis unit 15 of the injector diagnosis device 1 according to the present embodiment diagnoses whether or not the injectors have a mechanical failure based on the frequency characteristics of the operating sound which is calculated by the frequency characteristics calculation unit 13, and the normal engine sound model and the abnormal engine sound model which is generated by the engine sound model generator 14. This configuration does not have to collect or store relevant data in the past as in the conventional techniques, and the present embodiment therefore enables easy diagnosis about whether or not the injectors have a mechanical failure.

The injector diagnosis unit 15 then detects the combustion frequency components and the specific frequencies, which appear only in the abnormal engine sound model, based on the frequency characteristics of the operating sound which is calculated by the frequency characteristics calculation unit 13, and the normal engine sound model and the abnormal engine sound model which is generated by the engine sound model generator 14, and compares the sound-pressure level of the detected specific frequency components with the sound-pressure level of the combustion frequency components to easily diagnose whether or not the injector has a mechanical failure.

Focusing on the specific frequency components in this way allows the diagnosis to be less affected from the noise, so that the present embodiment enables more accurate diagnosis even in a noisy environment.

When diagnosing that the injectors do not have a mechanical failure, the injector diagnosis unit 15 then compares the ratio of the sound-pressure level of the specific frequency components to the sound-pressure level of the combustion frequency components with a second threshold that is larger than the first threshold to diagnose whether or not the injectors have a sign of a mechanical failure. This enables not only a diagnosis about whether or not the injectors have a mechanical failure, but also a diagnosis about whether or not the injectors have a sign of mechanical failure.

The injector diagnosis device 1 is installed on a smartphone that the operator easily carries. This allows the operator to quickly and easily diagnose the status of the injectors at the site.

[Injector Diagnosis Method]

Figure 4:
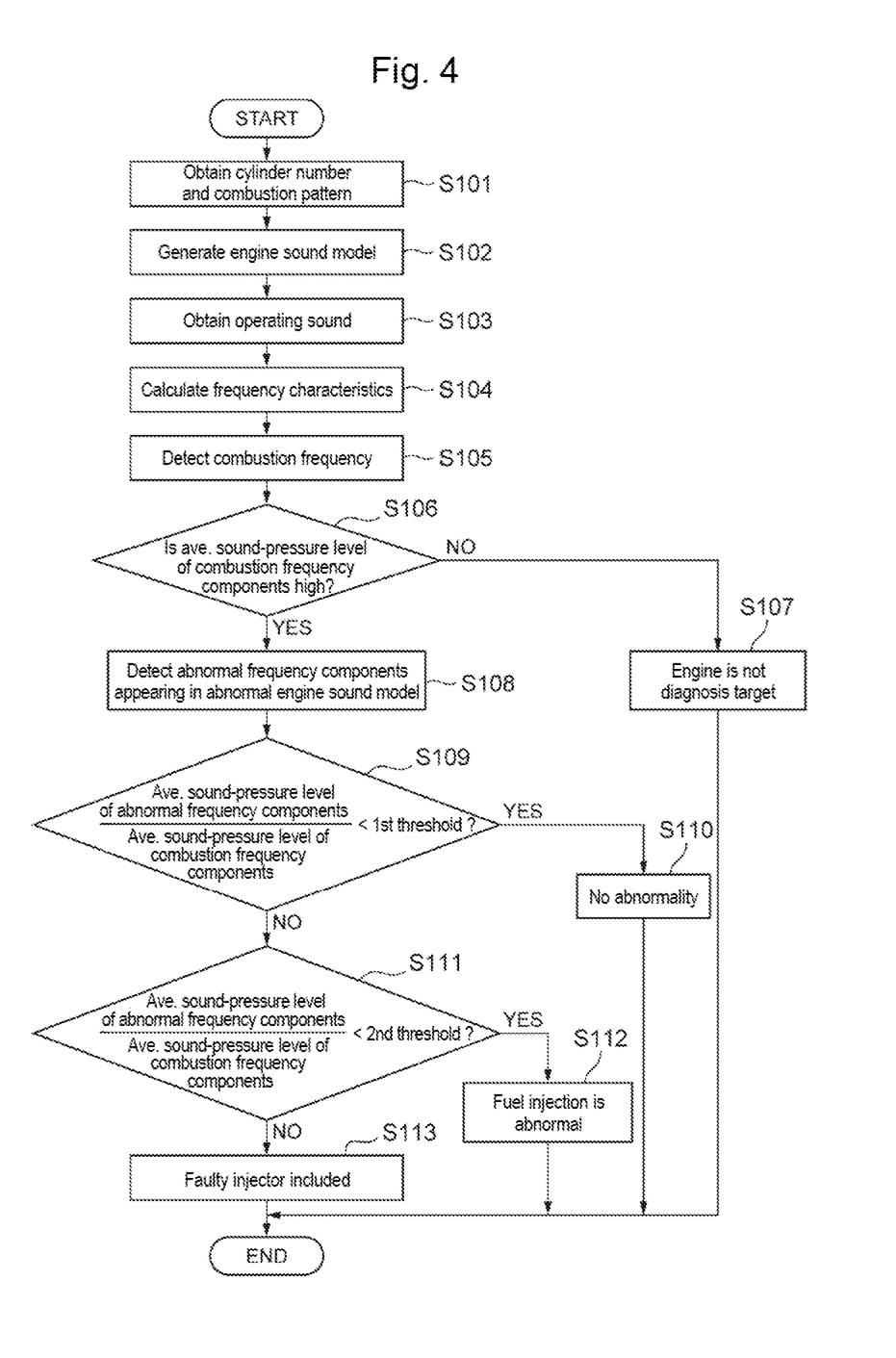
FIG. 4 is a flowchart for explaining the injector diagnosis method.

The following describes an injector diagnosis method using the injector diagnosis device 1 with reference to FIGS. 4 to 6B. FIG. 4 is a flowchart for explaining the injector diagnosis method, and FIGS. 5A to 5C and 6A to 6B are schematic diagrams for explaining the operation with a smartphone.

The injector diagnosis method according to this embodiment includes: an engine sound model generating step of generating a normal engine sound model and an abnormal engine sound model based on the number of cylinders of the engine and the combustion pattern of the engine; a frequency characteristics calculation step of obtaining the operating sound of the engine that operates with the combustion pattern, and calculating the frequency characteristics of the obtained operating sound; and an injector diagnosis step of diagnosing, based on the normal engine sound model and the abnormal engine sound model which is generated at the engine sound model generating step and the frequency characteristics of the operating sound which is calculated at the frequency characteristics calculation step, whether or not the injectors have a mechanical failure. In one example, this injector diagnosis method is conducted when the multi-cylinder engine 2 is in a low-idling state (at the minimum rotation speed of the engine).

Figure 5A:
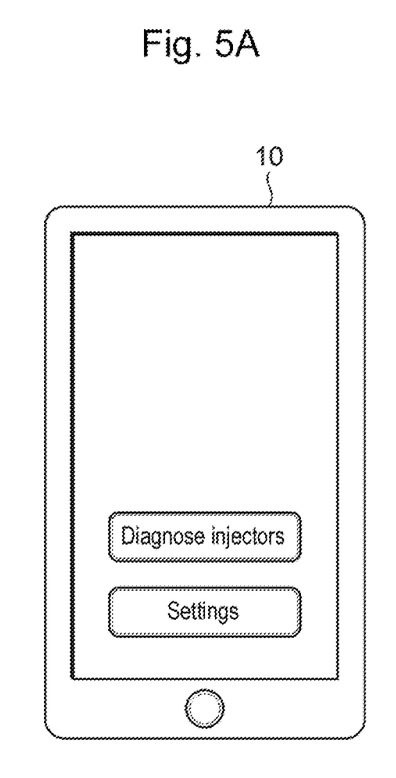
FIG. 5A is a schematic diagram for explaining the operation with a smartphone.

Specifically, the operator first prepares the injector diagnosis device 1 by selecting the application software for the injector diagnosis device 1 installed in the smartphone 10 (see FIG. 5A).

Figure 5B:
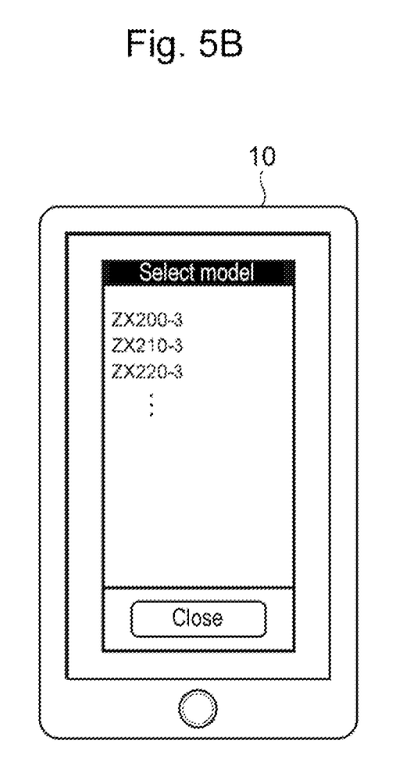
FIG. 5B is a schematic diagram for explaining the operation with a smartphone.
Figure 5C:
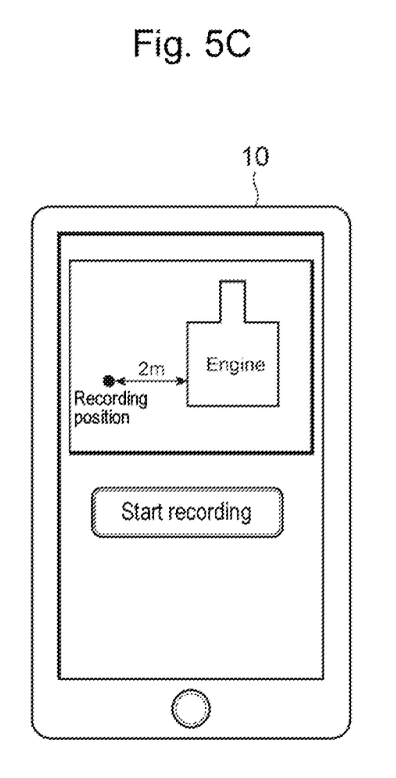
FIG. 5C is a schematic diagram for explaining the operation with a smartphone.
Figure 6A:
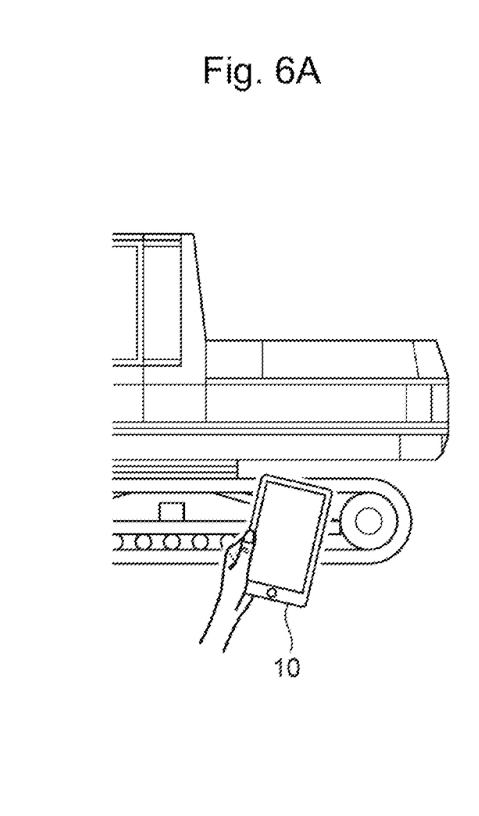
FIG. 6A is a schematic diagram for explaining the operation with a smartphone.
Figure 6B:
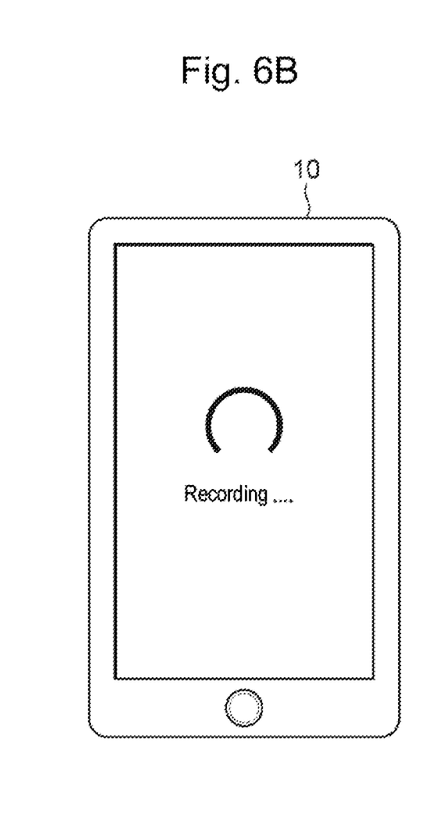
FIG. 6B is a schematic diagram for explaining the operation with a smartphone.

Next, the operator selects the model of the multi-cylinder engine 2 to be diagnosed as shown in step S101 of FIG. 4 (see FIG. 5B). Once the model is selected, the engine information input unit 11 is allowed to obtain the number of cylinders of the engine and the combustion pattern of the engine related to the selected model.

In step S102 following step S101, the engine sound model generator 14 generates a normal engine sound model and an abnormal engine sound model based on the number of cylinders of the engine and the combustion pattern of the engine that are obtained by the engine information input unit 11 (see FIGS. 3A and 3B).

This step S102 corresponds to an "engine sound model generating step" recited in the claims.

In step S103 following step 102, the method obtains operating sound. Specifically, the operator follows the procedure displayed on the screen of the smartphone 10 (see FIG. 5C) to bring the smartphone 10 close to the multi-cylinder engine 2 of the construction machine toward the designated recording position (see FIG. 6A), and record the operating sound of the multi-cylinder engine 2 for a certain period of time (e.g., about 15 seconds) with the microphone (i.e., the operating sound obtainment unit 12) built in the smartphone 10 (see FIG. 6B).

In step S104 following step S103, the frequency characteristics calculation unit 13 calculates the frequency characteristics of the operating sound based on the operating sound obtained in step S103 by fast Fourier transformation (FFT), for example. In this step, to suppress the influence of noise, the frequency characteristics calculation unit 13 calculates the frequency characteristics of the operating sound for about 15 seconds while shifting the frames of about 3 seconds by half for FFT to obtain the averaging.

Steps S103 and S104 correspond to a "frequency characteristics calculation step" recited in the claims.

In step S105 following step S104, the injector diagnosis unit 15 firstly detects the combustion frequency of the operating sound based on the frequency characteristics calculated by the frequency characteristics calculation unit 13 and the normal engine sound model or the abnormal engine sound model which is generated by the engine sound model generator 14.

Specifically, the injector diagnosis unit 15 detects the theoretical value of the primary combustion frequency of the operating sound based on the normal engine sound model which is generated by the engine sound model generator 14, and then detects, based on the theoretical value of the detected primary combustion frequency, the peak value with the highest sound-pressure level within a certain allowable range (such as 2 Hz) as the actual value of the primary combustion frequency of the operating sound. In this case, the Nth-order combustion frequency of the obtained operating sound is N times the actual value of the primary combustion frequency.

In step S106 following step S105, the injector diagnosis unit 15 further calculates the average sound-pressure level of the combustion frequency component based on the actual value of the combustion frequency of the operating sound detected in step S105, and determines whether the average sound-pressure level of the calculated combustion frequency component is high or not.

Specifically, the injector diagnosis unit 15 uses the actual value of the primary combustion frequency of the detected operating sound, the actual value of the secondary combustion frequency, and the actual value of the third-order combustion frequency to calculate the average sound-pressure level of the components from the primary combustion frequency to the third-order combustion frequency. Then the injector diagnosis unit 15 compares the calculated average sound-pressure level of the combustion frequency components with the sound-pressure level of noise.

If it is determined that the average sound-pressure level of the combustion frequency components is not higher than the sound-pressure level of noise, the injector diagnosis unit 15 determines that the multi-cylinder engine 2 is not the target of diagnosis or that the multi-cylinder engine 2 to be diagnosed has the combustion pattern that is not an expected combustion pattern, and transmits the diagnosis result to the diagnosis result output unit 16 (see step S107). An example of "the multi-cylinder engine 2 being not the target of diagnosis" includes a selection error in step S101 when the operator selects the model of the multi-cylinder engine 2. An example of "the multi-cylinder engine 2 having the combustion pattern that is not an expected combustion pattern" includes a setting error by the operator. For example, the operation mode is erroneously set to high idle instead of low idle.

If it is determined that the average sound-pressure level of the combustion frequency components is higher than the sound-pressure level of noise, the injector diagnosis unit 15 detects an abnormal frequency component appearing in the abnormal engine sound model which is generated by the engine sound model generator 14 (see step S108).

Specifically, the injector diagnosis unit 15 compares the frequency characteristics of the operating sound which is calculated by the frequency characteristics calculation unit 13, and the abnormal engine sound model which is generated by the engine sound model generator 14, and detects the peak value with the highest sound-pressure level existing within a certain allowable range (such as 1 Hz) based on the specific frequency (i.e., abnormal frequency) component existing in the abnormal engine sound model. The injector diagnosis unit 15 then calculates the average level of the highest peak value detected, and sets the result obtained as the average sound-pressure level of the abnormal frequency component.

In step S109 following step S108, the injector diagnosis unit 15 compares the average sound-pressure level of the combustion frequency component with the average sound-pressure level of the abnormal frequency component obtained in step S108.

Specifically, the injector diagnosis unit 15 calculates the ratio between the average sound-pressure level of the abnormal frequency component and the average sound-pressure level of the combustion frequency component, and compares the calculated ratio with a first threshold set in advance. If the ratio calculated above is smaller than the first threshold, the injector diagnosis unit 15 diagnoses that the injectors do not have a mechanical failure (i.e., no abnormality) (see step S110).

If the calculated ratio is greater than or equal to the first threshold, the injector diagnosis unit 15 further compares the calculated ratio with a second threshold set in advance (see step S111). The second threshold is larger than the first threshold. If the calculated ratio is smaller than the second threshold, the injector diagnosis unit 15 diagnoses that the fuel injection amount has decreased and the injectors have abnormality in the fuel injection amount (i.e., the injectors have a sign of a mechanical failure) (see step S112). If the calculated ratio is greater than or equal to the second threshold, the injector diagnosis unit 15 diagnoses that the fuel injection amount has decreased greatly and the injectors have a mechanical failure (see step S113).

Steps S105 to S113 correspond to the "injector diagnosis step" recited in the claims.

The injector diagnosis method of the present embodiment includes the engine sound model generating step of generating a normal engine sound model and an abnormal engine sound model, the frequency characteristics calculation step of calculating the frequency characteristics of the operating sound, and the injector diagnosis step of diagnosing a mechanical failure of the injectors based on the normal engine sound model, the abnormal engine sound model, and the frequency characteristics of the operating sound. This configuration does not have to collect or store relevant data in the past as in the conventional techniques, and the present embodiment therefore enables easy diagnosis about whether or not the injectors have a mechanical failure.

The injector diagnosis step compares the ratio of the sound-pressure level of the specific frequency component to the sound-pressure level of the combustion frequency component with a second threshold that is larger than the first threshold. This enables a diagnosis about whether or not the injectors have a sign of a mechanical failure. This enables not only a diagnosis about whether or not the injectors have a mechanical failure, but also a diagnosis about whether or not the injectors have a sign of mechanical failure.

Focusing on the specific frequency components to diagnose whether or not the injectors have a mechanical failure allows the diagnosis to be less affected from the noise, so that the present embodiment enables more accurate diagnosis even in a noisy environment.

The injector diagnosis method of the present embodiment is conducted when the multi-cylinder engine 2 is low-idling. In this way, the method starts diagnosing after setting the multi-cylinder engine 2 at the lowest rotational speed, which leads to the detection of an initial failure of the injectors caused by a fuel leak or stiffness, and thus enables timely proposal for repair to the customer.

The injector diagnosis method according to this embodiment may omit step S111 and step S112 as described above. In other words, the injector diagnosis method of the present embodiment may only diagnose the presence or not of mechanical failure of the injectors without diagnosing the presence or not of a sign of mechanical failure of the injectors.

Figure 7:
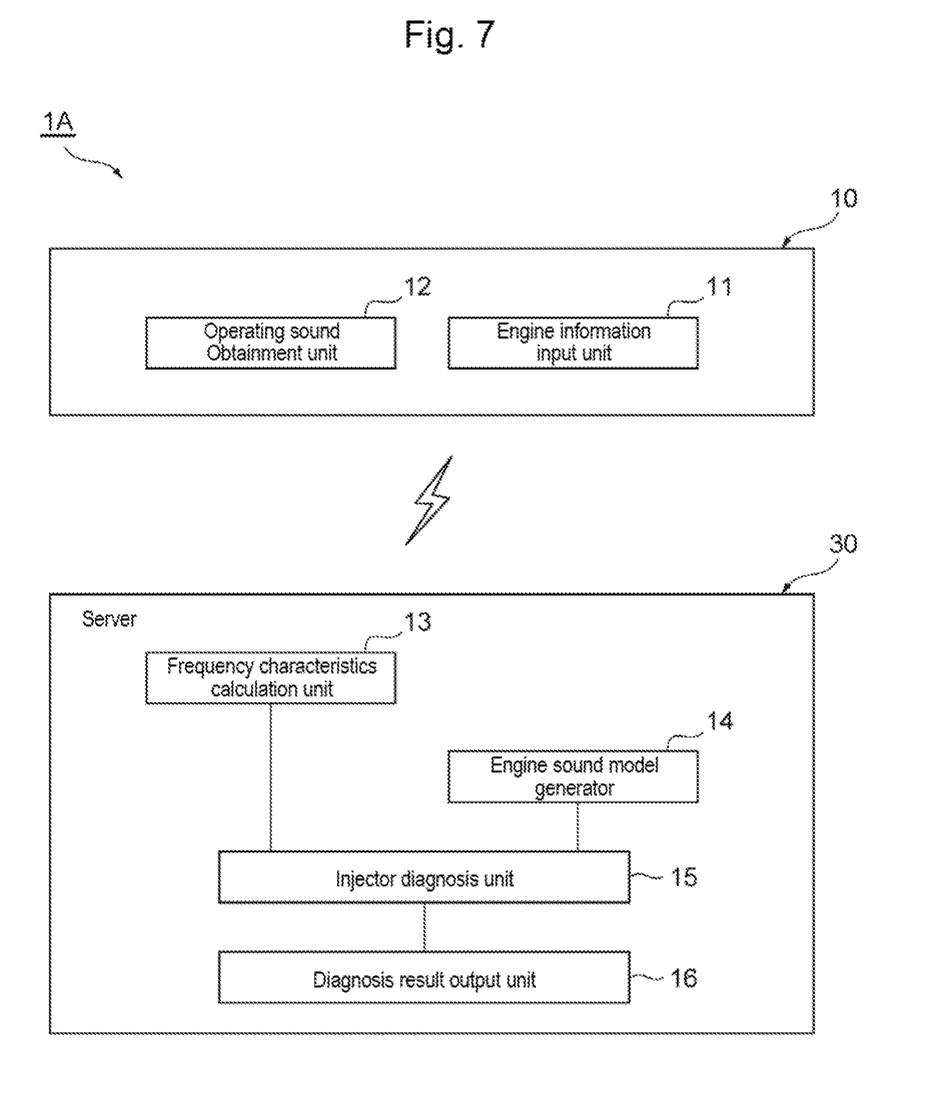
FIG. 7 schematically shows the configuration of an injector diagnosis device according to a second embodiment.

The engine sound model generating step S102 described above may be between step S101 of obtaining the number of cylinders and the combustion pattern and step S105 of detecting the combustion frequency. The order of step S103 of obtaining the operating sound and step S104 of calculating the frequency Second Embodiment of Injector Diagnosis Device FIG. 7 schematically shows the configuration of an injector diagnosis device according to a second embodiment. The injector diagnosis device 1A of this embodiment differs from the first embodiment described above in that the frequency characteristics calculation unit 13, the engine sound model generator 14, the injector diagnosis unit 15, and the diagnosis result output unit 16 are provided in a server 30, but the other configuration is the same as that of the first embodiment.

As shown in FIG. 7, the injector diagnosis device 1A of this embodiment includes the engine information input unit 11 and the operating sound obtainment unit 12 in the smartphone 10, and includes the frequency characteristics calculation unit 13, the engine sound model generator 14, the injector diagnosis unit 15, and the diagnosis result output unit 16 in the server 30. The server 30 is located in the control center, for example, and is configured to be communicable with the smartphone 10.

The injector diagnosis device 1A having such a structure is configured so that the engine information input unit 11 transmits the input number of engine cylinders and engine combustion pattern to the engine sound model generator 14 in the server 30, and so that the operating sound obtainment unit 12 transmits the obtained operating sound to the frequency characteristics calculation unit 13 in the server 30. The diagnosis result output unit 16 is configured so as to transmit the diagnosis result to the smartphone 10 and/or the construction machine equipped with the multi-cylinder engine 2, for example. With this configuration, the smartphone 10 and/or the construction machine easily check the diagnosis result.

The injector diagnosis device 1A of this embodiment has the same actions and advantageous effects as those of the first embodiment described above, and also has the advantage of increasing the speed of processing the diagnosis compared with the injector diagnosis device 1 of the first embodiment. This is because the frequency characteristics calculation unit 13, the engine sound model generator 14, the injector diagnosis unit 15, and the diagnosis result output unit 16 are provided in a server 30.

The injector diagnosis method using the injector diagnosis device 1A is the same as that described in the first embodiment above, and the redundant explanations are omitted.

Third Embodiment of Injector Diagnosis Device

Figure 8:
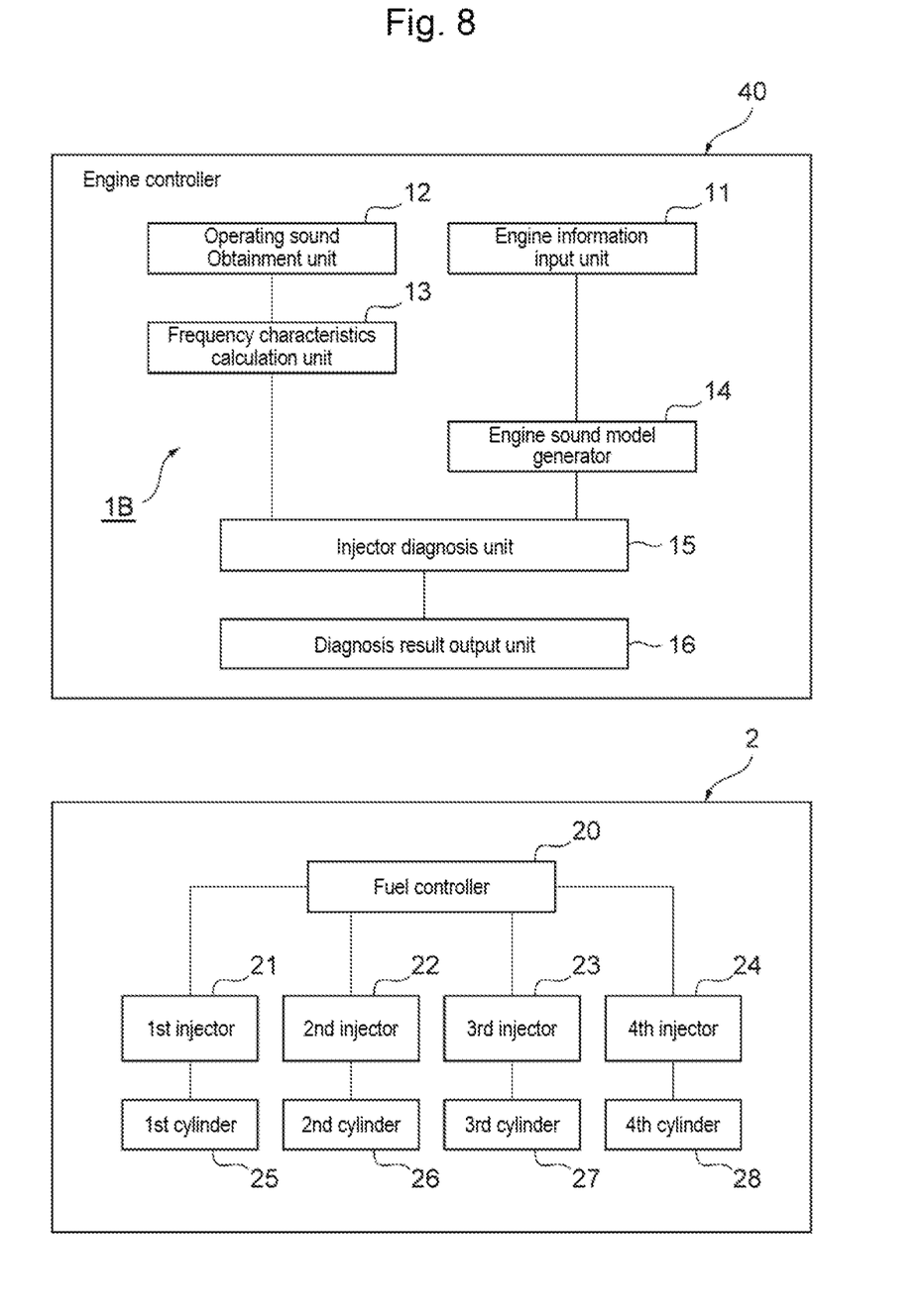
FIG. 8 schematically shows the configuration of an injector diagnosis device according to a third embodiment.

FIG. 8 schematically shows the configuration of an injector diagnosis device according to a third embodiment. The injector diagnosis device 1B of this embodiment differs from the first embodiment described above in that the engine information input unit 11, the operating sound obtainment unit 12, the frequency characteristics calculation unit 13, the engine sound model generator 14, the injector diagnosis unit 15, and the diagnosis result output unit 16 are all provided in the engine controller 40 of the multi-cylinder engine 2 without using a smartphone, but the other configuration is the same as that of the first embodiment.

In one example, the engine controller 40 includes a microcomputer made up of the combination of a central processing unit (CPU) that executes calculations, a read only memory (ROM) as a secondary storage device that records programs for the calculations, and a random access memory (RAM) as a temporary storage of the calculation progress or temporary control variables. The engine controller 40 controls the overall operation of the multi-cylinder engine 2 by executing the stored programs.

The engine information input unit 11 of this embodiment obtains the number of cylinders of the engine and the combustion pattern of the engine directly from the multi-cylinder engine 2 at the start of diagnosis, and transmits the obtained results to the engine sound model generator 14.

In the present embodiment, the operating sound obtainment unit 12 is configured to record the operating sound using a microphone placed in the engine room, for example, in accordance with an instruction from the engine controller 40.

The injector diagnosis device 1B of this embodiment has the same actions and advantageous effects as those of the first embodiment described above, and the injector diagnosis device 1B enables easy diagnosis about the presence or not of a mechanical failure of the injectors and the presence or not of a sign of mechanical failure of the injectors without the necessity of the operator going to the site, and also enables a diagnosis of the target in various operating conditions. This is because the engine information input unit 11, the operating sound obtainment unit 12, the frequency characteristics calculation unit 13, the engine sound model generator 14, the injector diagnosis unit 15, and the diagnosis result output unit 16 are provided inside the multi-cylinder engine 2.

The injector diagnosis method using the injector diagnosis device 1B automatically starts under preset conditions (for example, once/500 hours or when the engine rotation speed reaches the minimum speed). For example, when the multi-cylinder engine 2 has been in operation for 500 hours, the engine controller 40 activates the injector diagnosis device 1B to carry out a diagnosis of the injectors about the presence or not of a mechanical failure or the presence or not of a sign of mechanical failure. The specific process in the method for injector diagnosis is the same as that described in the first embodiment above except that no smartphone is used, and the redundant explanations are omitted.

Fourth Embodiment of Injector Diagnosis Device

Figure 9:
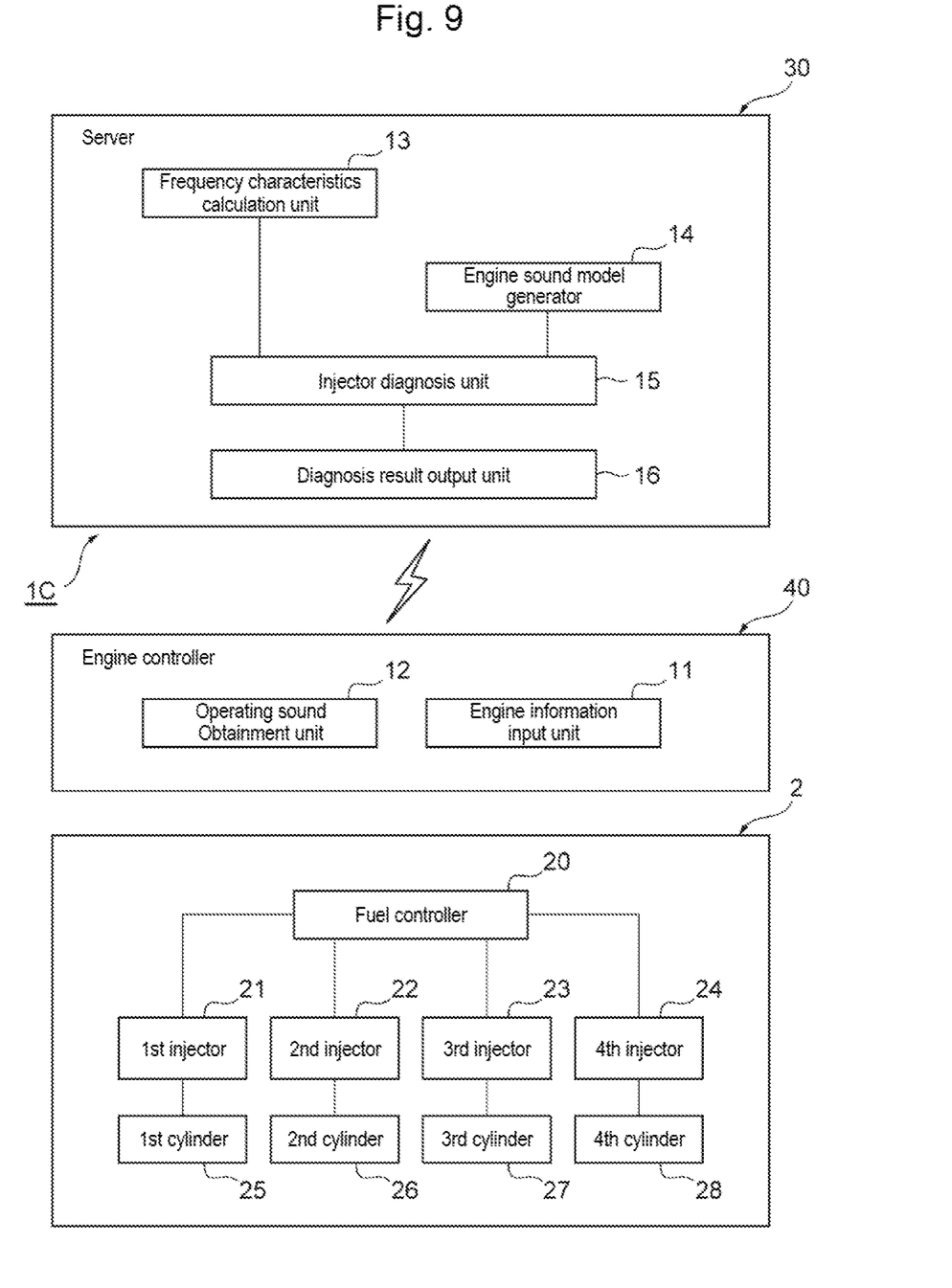
FIG. 9 schematically shows the configuration of an injector diagnosis device according to a fourth embodiment.

FIG. 9 schematically shows the configuration of an injector diagnosis device according to a fourth embodiment. The injector diagnosis device 1C of this embodiment differs from the first embodiment described above in that the engine information input unit 11 and the operating sound obtainment unit 12 are provided in the engine controller 40 of the multi-cylinder engine 2, and the frequency characteristics calculation unit 13, the engine sound model generator 14, the injector diagnosis unit 15, and the diagnosis result output unit 16 are provided in the server 30, but the other configuration is the same as that of the first embodiment.

As shown in FIG. 9, the injector diagnosis device 1C of this embodiment includes the engine information input unit 11 and the operating sound obtainment unit 12 in the engine controller 40 of the multi-cylinder engine 2, and includes the frequency characteristics calculation unit 13, the engine sound model generator 14, the injector diagnosis unit 15, and the diagnosis result output unit 16 in the server 30. The server 30 is located in the control center, for example, and is configured to be communicable with the multi-cylinder engine 2.

The injector diagnosis device 1C having such a structure is configured so that the engine information input unit 11 transmits the input number of engine cylinders and engine combustion pattern to the engine sound model generator 14 in the server 30, and so that the operating sound obtainment unit 12 transmits the obtained operating sound to the frequency characteristics calculation unit 13 in the server 30. The diagnosis result output unit 16 is configured so as to transmit the diagnosis result to the construction machine equipped with the multi-cylinder engine 2, for example. With this configuration, the construction machine easily checks the diagnosis result.

The injector diagnosis device 1C of this embodiment has the same actions and advantageous effects as those of the third embodiment described above, and also has the advantage of increasing the speed of processing the diagnosis compared with the injector diagnosis device 1B of the third embodiment. This is because the frequency characteristics calculation unit 13, the engine sound model generator 14, the injector diagnosis unit 15, and the diagnosis result output unit 16 are provided in a server 30.

The injector diagnosis method using the injector diagnosis device 1C is the same as that described in the first embodiment above other than that a smartphone is not used, and the redundant explanations are omitted.

That is a detailed description of the embodiments of the present invention. The present invention is not limited to the above-stated embodiment, and the design may be modified variously without departing from the spirits of the present invention.

REFERENCE SIGNS LIST 1, 1A, 1B, 1C Injector diagnosis device
2 Multi-cylinder engine
10 Smartphone
11 Engine information input unit
12 Operating sound obtainment unit
13 Frequency characteristics calculation unit
14 Engine sound model generator
15 Injector diagnosis unit
16 Diagnosis result output unit
20 Fuel controller
21 First injector
22 Second injector
23 Third injector
24 Fourth injector
25 First cylinder
26 Second cylinder
27 Third cylinder
28 Fourth cylinder
30 Server
40 Engine controller

The invention claimed is:

1. An injector diagnosis device configured to diagnose a status of each of a plurality of injectors installed in a multi-cylinder engine, wherein each of the plurality of injectors injects fuel to a corresponding cylinder, said injector diagnosis device comprising:
an engine sound model generator configured to generate a normal engine sound model and an abnormal engine sound model based on the number of the cylinders of the engine and a combustion pattern of the engine;
an operating sound obtainment unit configured to obtain an operating sound of the engine operating with the combustion pattern;
a frequency characteristics calculation unit configured to calculate frequency characteristics of the operating sound obtained by the operating sound obtainment unit; and
an injector diagnosis unit configured to diagnose whether or not the injectors have a mechanical failure based on the frequency characteristics of the operating sound which is calculated by the frequency characteristics calculation unit, and the normal engine sound model and the abnormal engine sound model which is generated by the engine sound model generator.

2. The injector diagnosis device according to claim 1, wherein the injector diagnosis unit detects combustion frequency components and specific frequency components, which appear only in the abnormal engine sound model, based on the frequency characteristics of the operating sound which is calculated by the frequency characteristics calculation unit, and the normal engine sound model and the abnormal engine sound model which are generated by the engine sound model generator, and compares a sound-pressure level of the detected specific frequency components with a sound-pressure level of the combustion frequency components to diagnose whether or not the injectors have a mechanical failure.

3. The injector diagnosis device according to claim 2, wherein the injector diagnosis unit compares the ratio of the sound-pressure level of the specific frequency components to the sound-pressure level of the combustion frequency components with a preset first threshold to diagnose whether or not has injectors have a mechanical failure.

4. The injector diagnosis device according to claim 3, wherein when the injector diagnosis unit diagnoses that the injectors do not have a mechanical failure, the injector diagnosis unit compares the ratio of the sound-pressure level of the specific frequency components to the sound-pressure level of the combustion frequency components with a second threshold that is larger than the first threshold to diagnose whether or not the injectors have an abnormality in an amount of fuel injection.

5. The injector diagnosis device according to claim 1, wherein the engine sound model generator generates a combustion frequency component related to the number of cylinders and the combustion pattern, and an abnormal frequency component that appears only in the abnormal engine sound model related to the ratio of a primary combustion frequency to the number of cylinders.

6. The injector diagnosis device according to claim 1, further comprising a diagnosis result output unit configured to output a result of diagnosis by the injector diagnosis unit.

7. The injector diagnosis device according to claim 1, wherein the engine sound model generator, the frequency characteristics calculation unit, and the injector diagnosis unit are disposed in a server that is communicable with a machine to be diagnosed equipped with the multi-cylinder engine.

8. The injector diagnosis device according to claim 1, wherein the engine sound model generator, the operating sound obtainment unit, the frequency characteristics calculation unit, and the injector diagnosis unit are disposed in a mobile terminal.

9. The injector diagnosis device according to claim 8, wherein the mobile terminal is a smartphone.

10. The injector diagnosis device according to claim 1, wherein the operating sound obtainment unit is disposed in a mobile terminal, and
the engine sound model generator, the frequency characteristics calculation unit, and the injector diagnosis unit are disposed in a server that is communicable with the mobile terminal.

11. An injector diagnosis method that diagnoses a status of each of a plurality of injectors installed in a multi-cylinder engine, wherein each of the plurality of injectors injects fuel to a corresponding cylinder, said injector diagnosis method comprising:
an engine sound model generating step of generating a normal engine sound model and an abnormal engine sound model based on the number of the cylinders of the engine and a combustion pattern of the engine;
a frequency characteristics calculation step of obtaining an operating sound of the engine that operates with the combustion pattern, and calculating frequency characteristics of the obtained operating sound; and
an injector diagnosis step of diagnosing, based on the normal engine sound model and the abnormal engine sound model which is generated at the engine sound model generating step, and the frequency characteristics of the operating sound which is calculated at the frequency characteristics calculation step, whether or not the injectors have a mechanical failure.

12. The injector diagnosis method according to claim 11, wherein the injector diagnosis step detects combustion frequency components and specific frequency components, which appear only in the abnormal engine sound model, based on the normal engine sound model and the abnormal engine sound model which are generated at the engine sound model generating step, and the frequency characteristics of the operating sound which is calculated at the frequency characteristics calculation step, and compares a sound-pressure level of the detected specific frequency components with a sound-pressure level of the combustion frequency components to diagnose whether or not the injectors have a mechanical failure.

13. The injector diagnosis method according to claim 12, wherein the injector diagnosis step compares the ratio of the sound-pressure level of the specific frequency components to the sound-pressure level of the combustion frequency components with a preset first threshold to diagnose whether or not the injectors have a mechanical failure.

14. The injector diagnosis method according to claim 13, wherein when the injector diagnosis step diagnoses that the injectors do not have a mechanical failure, the injector diagnosis step compares the ratio of the sound-pressure level of the specific frequency components to the sound-pressure level of the combustion frequency components with a second threshold that is larger than the first threshold to diagnose whether or not the injectors an abnormality in an amount of fuel injection.

15. The injector diagnosis method according to claim 11, wherein the engine sound model generating step generates a combustion frequency component related to the number of cylinders and the combustion pattern, and an abnormal frequency component that appears only in the abnormal engine sound model related to the ratio of a primary combustion frequency to the number of cylinders.

* * * * *

UNITED STATES PATENT AND TRADEMARK OFFICE
CERTIFICATE OF CORRECTION

| | | |
|---|---|---|
| PATENT NO. | : 11,732,669 B2 | Page 1 of 1 |
| APPLICATION NO. | : 17/436972 | |
| DATED | : August 22, 2023 | |
| INVENTOR(S) | : Tien Trien Le et al. | |

It is certified that error appears in the above-identified patent and that said Letters Patent is hereby corrected as shown below:

In the Claims

In Column 14, Claim 3, Line 45, delete "has"
And replace with --the--

In Column 16, Claim 14, Line 27, insert --have-- between "injectors" and "an"

Signed and Sealed this
Twenty-third Day of January, 2024

*Katherine Kelly Vidal*

Katherine Kelly Vidal
*Director of the United States Patent and Trademark Office*